United States Patent
Lee (10) Patent No.: US 11,429,560 B2
(45) Date of Patent: Aug. 30, 2022

(54) SYSTEMS AND METHODS FOR DETECTION OF AUTOMATABLE SHEET MODIFICATION ACTIONS

(71) Applicant: Smartsheet Inc., Bellevue, WA (US)

(72) Inventor: Tony Jay Lee, Bellevue, WA (US)

(73) Assignee: Smartsheet Inc., Bellevue, WA (US)

( * ) Notice: Subject to any disclaimer, the term of this patent is extended or adjusted under 35 U.S.C. 154(b) by 877 days.

(21) Appl. No.: 15/967,314

(22) Filed: Apr. 30, 2018

(65) Prior Publication Data
US 2019/0332686 A1    Oct. 31, 2019

(51) Int. Cl.
| | | |
|---|---|---|
| G06F 16/13 | (2019.01) | |
| G06F 16/11 | (2019.01) | |
| G06F 16/17 | (2019.01) | |
| G06F 16/903 | (2019.01) | |
| G06F 40/166 | (2020.01) | |
| G06F 40/177 | (2020.01) | |

(52) U.S. Cl.
CPC .......... G06F 16/137 (2019.01); G06F 16/122 (2019.01); G06F 16/1734 (2019.01); G06F 16/90344 (2019.01); G06F 40/166 (2020.01); G06F 40/177 (2020.01)

(58) Field of Classification Search
CPC .... G06F 16/137; G06F 16/174; G06F 16/217; G06F 16/122; G06F 16/1734; G06F 16/90344; G06F 40/166; G06F 40/177
See application file for complete search history.

(56) References Cited

U.S. PATENT DOCUMENTS

| | | | |
|---|---|---|---|
| 2009/0222386 A1* | 9/2009 | Proctor | G06N 5/025 706/48 |
| 2013/0041900 A1* | 2/2013 | McCoy | G06F 16/20 707/E17.046 |
| 2019/0251284 A1* | 8/2019 | Anton | G06F 16/2219 |
| 2019/0311057 A1* | 10/2019 | Sung | G06F 16/24552 |

* cited by examiner

*Primary Examiner* — Marcin R Filipczyk
(74) *Attorney, Agent, or Firm* — Christensen O'Connor Johnson Kindness PLLC (57) ABSTRACT

In some embodiments, techniques are provided for improving the detection of repeated actions during the manipulation of tabular data in order to enable the creation of automated action sequences. Activity log records are created that represent actions taken with respect to a set of tabular data. One or more normalized versions of the activity log records may be created. The activity log records (and, in some embodiments, the normalized versions of the activity log records) may be grouped and hashed together, such that groups of activity log records may be compared to each other by comparing the resulting hashes. Grouping and hashing may allow large numbers of comparisons to be made efficiently enough to support detection of repeated actions on large scale, multi-user, and multi-tenant systems.

18 Claims, 7 Drawing Sheets

| ORDER | VARIABLIZED ACTION | MULTI-ROW HASH |
|---|---|---|
| 1 | OPEN SHEET ("A") | |
| 2 | ROW "B" ADDED | |
| 3 | FOCUS("C", "B") | [HASH OF 1-5] |
| 4 | ENTER TEXT("D") | |
| 5 | SAVE SHEET ("A") | |
| 6 | OPEN SHEET ("X") | |
| 7 | FOCUS("G", "B") | |
| 8 | ENTER TEXT ("H") | |
| 9 | CHANGE CELL FORMAT (J) | |
| 10 | ROW "K" ADDED | [HASH OF 6-15] |
| 11 | FOCUS("C", "B") | |
| 12 | COPY TO CLIPBOARD | |
| 13 | FOCUS("L", "K") | |
| 14 | PASTE FROM CLIPBOARD | |
| 15 | SAVE SHEET ("X") | |

| SHEET ONE | | | | |
|---|---|---|---|---|
| ROW | COLUMN A | COLUMN B | COLUMN C | COLUMN D |
| 1 | FOO | BAR | BAZ | BAZ |
| 2 | ONE | TWO | THREE | THREE |
| 3 | THREE | EIGHT | SEVEN | SEVEN |
| 4 | SIX | FIVE | FOUR | FOUR |

*FIG. 3A*

| ORDER | ACTION |
|---|---|
| 1 | OPEN SHEET ("SHEET ONE") |
| 2 | ROW 5 ADDED |
| 3 | FOCUS([COLUMN A]5) |
| 4 | ENTER TEXT("NEW CELL ONE") |
| 5 | FOCUS([COLUMN B]5) |
| 6 | ENTER TEXT("NEW CELL TWO") |
| 7 | FOCUS([COLUMN C]5) |
| 8 | ENTER TEXT ("NEW CELL THREE") |
| 9 | CHANGE CELL FORMAT (UNDERLINE=TRUE) |
| 10 | ROW 6 ADDED |
| 11 | FOCUS([COLUMN A]5) |
| 12 | COPY TO CLIPBOARD |
| 13 | FOCUS([COLUMN D]6) |
| 14 | PASTE FROM CLIPBOARD |

*FIG. 3B*

| SHEET ONE | | | | |
|---|---|---|---|---|
| ROW | COLUMN A | COLUMN B | COLUMN C | COLUMN D |
| 1 | FOO | BAR | BAZ | BAZ |
| 2 | ONE | TWO | THREE | THREE |
| 3 | THREE | EIGHT | SEVEN | SEVEN |
| 4 | SIX | FIVE | FOUR | FOUR |
| 5 | NEW CELL ONE | NEW CELL TWO | NEW CELL THREE | |
| 6 | | | | NEW CELL ONE |

*FIG. 3C*

| ORDER | VARIABLIZED ACTION | HASH |
|---|---|---|
| 1 | OPEN SHEET ("A") | 0CD5D440CD1CF03C5ADAB3D993290830 |
| 2 | ROW "B" ADDED | 020CFC31AA169571B59679D9223F02B8 |
| 3 | FOCUS("C", "B") | E54E43EEEA75CDF9D77C71AFF61C431C |
| 4 | ENTER TEXT("D") | A24220A2A450EFC0E3D3AB7C079FB958 |
| 5 | FOCUS("E", "B") | DA9661DA6F18D0E92A3634E1A569339E |
| 6 | ENTER TEXT("F") | B40E1699AA243F5E450A7DC98E3BD01A |
| 7 | FOCUS("G", "B") | 207D3C24D400B6DE7CBD08BF6A83EB97 |
| 8 | ENTER TEXT ("H") | 0E81032A56DB160A236AACE8DCA9F3C0 |
| 9 | CHANGE CELL FORMAT (J) | DE4631735018DB7C9E3BBBE7417848B8 |
| 10 | ROW "K" ADDED | 85C2861A7A6F5E8CF7F0B320C0C3599D |
| 11 | FOCUS("C", "B") | E54E43EEEA75CDF9D77C71AFF61C431C |
| 12 | COPY TO CLIPBOARD | 8D37EE7F425A8082AC7C203871320823 |
| 13 | FOCUS("L", "K") | 6DB6E3655740328B10E0E88053197F99 |
| 14 | PASTE FROM CLIPBOARD | 3DC10373B9CD5C4B7C8084D393CF74BF |

*FIG. 4*

| ORDER | CANONICALIZED ACTION | HASH |
|---|---|---|
| 1 | OPEN SHEET () | 59083B490871FCA8EE57D9795B902B67 |
| 2 | ADD ROW | B1DFE4BEB06060E1B96CDF51E446F762 |
| 3 | FOCUS() | 687F1845D91913EE4A941F7080F5FE9B |
| 4 | ENTER TEXT() | A638D92CB2BCAEFABC86DCF02C4C9CFE |
| 5 | FOCUS() | 687F1845D91913EE4A941F7080F5FE9B |
| 6 | ENTER TEXT() | A638D92CB2BCAEFABC86DCF02C4C9CFE |
| 7 | FOCUS() | 687F1845D91913EE4A941F7080F5FE9B |
| 8 | ENTER TEXT () | A638D92CB2BCAEFABC86DCF02C4C9CFE |
| 9 | CHANGE CELL FORMAT () | 36887DD5BE2FD64964657684622300B5 |
| 10 | ADD ROW | B1DFE4BEB06060E1B96CDF51E446F762 |
| 11 | FOCUS() | 687F1845D91913EE4A941F7080F5FE9B |
| 12 | COPY TO CLIPBOARD | 8AA580657B4978994997BDFE0377DE3E |
| 13 | FOCUS() | 687F1845D91913EE4A941F7080F5FE9B |
| 14 | PASTE FROM CLIPBOARD | 8B0C85E1E00142590A15A12F18C2A570 |

*FIG. 5*

| ORDER | VARIABLIZED ACTION | MULTI-ROW HASH |
|---|---|---|
| 1 | OPEN SHEET ("A") | |
| 2 | ROW "B" ADDED | [HASH OF 1+2] |
| 3 | FOCUS("C", "B") | [HASH OF 2+3] |
| 4 | ENTER TEXT("D") | [HASH OF 3+4] |
| 5 | FOCUS("E", "B") | [HASH OF 4+5] |
| 6 | ENTER TEXT("F") | ⋮ |
| 7 | FOCUS("G", "B") | |
| 8 | ENTER TEXT ("H") | |
| 9 | CHANGE CELL FORMAT (J) | |
| 10 | ROW "K" ADDED | |
| 11 | FOCUS("C", "B") | |
| 12 | COPY TO CLIPBOARD | |
| 13 | FOCUS("L", "K") | |
| 14 | PASTE FROM CLIPBOARD | |

FIG. 6

| ORDER | VARIABLIZED ACTION | MULTI-ROW HASH | |
|---|---|---|---|
| 1 | OPEN SHEET ("A") | | |
| 2 | ROW "B" ADDED | [HASH OF 1+2+3] | |
| 3 | FOCUS("C", "B") | | [HASH OF 2+3+4] |
| 4 | ENTER TEXT("D") | [HASH OF 3+4+5] | |
| 5 | FOCUS("E", "B") | | [HASH OF 4+5+6] |
| 6 | ENTER TEXT("F") | [HASH OF 5+6+7] | |
| 7 | FOCUS("G", "B") | | [HASH OF 6+7+8] |
| 8 | ENTER TEXT ("H") | | |
| 9 | CHANGE CELL FORMAT (J) | | |
| 10 | ROW "K" ADDED | ⋮ | |
| 11 | FOCUS("C", "B") | | |
| 12 | COPY TO CLIPBOARD | | |
| 13 | FOCUS("L", "K") | | |
| 14 | PASTE FROM CLIPBOARD | | |

FIG. 7

| ORDER | VARIABLIZED ACTION | MULTI-ROW HASH |
|---|---|---|
| 1 | OPEN SHEET ("A") | [HASH OF 1-5] |
| 2 | ROW "B" ADDED | |
| 3 | FOCUS("C", "B") | |
| 4 | ENTER TEXT("D") | |
| 5 | SAVE SHEET ("A") | |
| 6 | OPEN SHEET ("X") | [HASH OF 6-15] |
| 7 | FOCUS("G", "B") | |
| 8 | ENTER TEXT ("H") | |
| 9 | CHANGE CELL FORMAT (J) | |
| 10 | ROW "K" ADDED | |
| 11 | FOCUS("C", "B") | |
| 12 | COPY TO CLIPBOARD | |
| 13 | FOCUS("L", "K") | |
| 14 | PASTE FROM CLIPBOARD | |
| 15 | SAVE SHEET ("X") | |

SYSTEMS AND METHODS FOR DETECTION OF AUTOMATABLE SHEET MODIFICATION ACTIONS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of automatically generating automation for manipulating tabular data is provided. A computing device obtains a set of activity log records. A computing device hashes sequential groups of the activity log records to create a set of hash values. A computing device detects a pattern by finding two or more duplicate hash values within the set of hash values. A computing device creates an automated action sequence using the activity log records used to create the two or more duplicate hash values.

In some embodiments, a tabular data management system comprising one or more computing devices is provided. The one or more computing devices are configured to automatically generate automation by obtaining a set of activity log records; hashing sequential groups of the activity log records to create a set of hash values; detecting a pattern by finding two or more duplicate hash values within the set of hash values; and creating an automated action sequence using the activity log records used to create the two or more duplicate hash values.

In some embodiments, a non-transitory computer-readable medium having computer-executable instructions stored thereon is provided. The instructions, in response to execution by one or more processors of a computing device, cause a computing device to perform actions for automatically generating automation for manipulating tabular data, the actions comprising: obtaining, by the computing device, a set of activity log records; hashing, by the computing device, sequential groups of the activity log records to create a set of hash values; detecting a pattern by finding, by the computing device, two or more duplicate hash values within the set of hash values; and creating, by the computing device, an automated action sequence using the activity log records used to create the two or more duplicate hash values.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Tabular data management systems are computer-based techniques for managing information in table formats. Such systems commonly organize information into one or more worksheets (also known as "spreadsheets" or "sheets"), with each worksheet including data in cells organized into a set of rows and a set of columns. Some tabular data management systems also provide additional interpretation of data stored in cells. One example of such a tabular data management system is Smartsheet, developed and provided by Smartsheet.com, Inc. Smartsheet is an interactive, hosted computer environment for managing and sharing information in a tabular format. Smartsheet is only one example of a tabular data management system, and though its described functionality can be seen as an example of the functionality of a tabular data management system, it should not be seen as limiting.

One challenge in working with tabular data is that tasks to be performed are often repetitive. That is, to update a given sheet with new information, a user may repeatedly copy a value from a cell in a first row and paste it into a corresponding cell in a second row; may copy a row to a new row and then update individual cells in that row; or may perform other sequences of tasks that are performed substantially the same way each time a sheet is updated. Because such sequences of tasks are repeatedly performed in substantially the same way, they are prime candidates to be automated, thus eliminating intermediate steps that would otherwise be performed by the user.

Such automation can sometimes be manually created by users. However, some users do not recognize opportunities when editing tasks can be automated, do not have the programming abilities that are normally needed to create such automation, or do not have the time to do so. Accordingly, it is desirable for the tabular data management system itself to identify opportunities for creating automation, and to automatically create such automation when appropriate. Further, in a tabular data management system that is used by a large number of users, it is desirable to compare information from multiple users in order to detect opportunities for creating automation, particularly when there may be multiple users from a single organization who perform similar tasks.

While computing devices are generally capable of detecting repeated sequences of information, one of the challenges in detecting repeated editing tasks in a tabular data management system is the open-ended nature and scale of the problem. When large numbers of users are interacting with the tabular data management system, the number of activities that are to be logged and sequences that are to be compared to each other quickly becomes difficult to manage. This complexity is magnified when it is uncertain how long the sequences to be compared to each other are. What is needed are techniques that allow fast comparison of large amounts of activity information in order to be able to detect duplicate sequences for the creation of automation based thereon.

Figure 1:
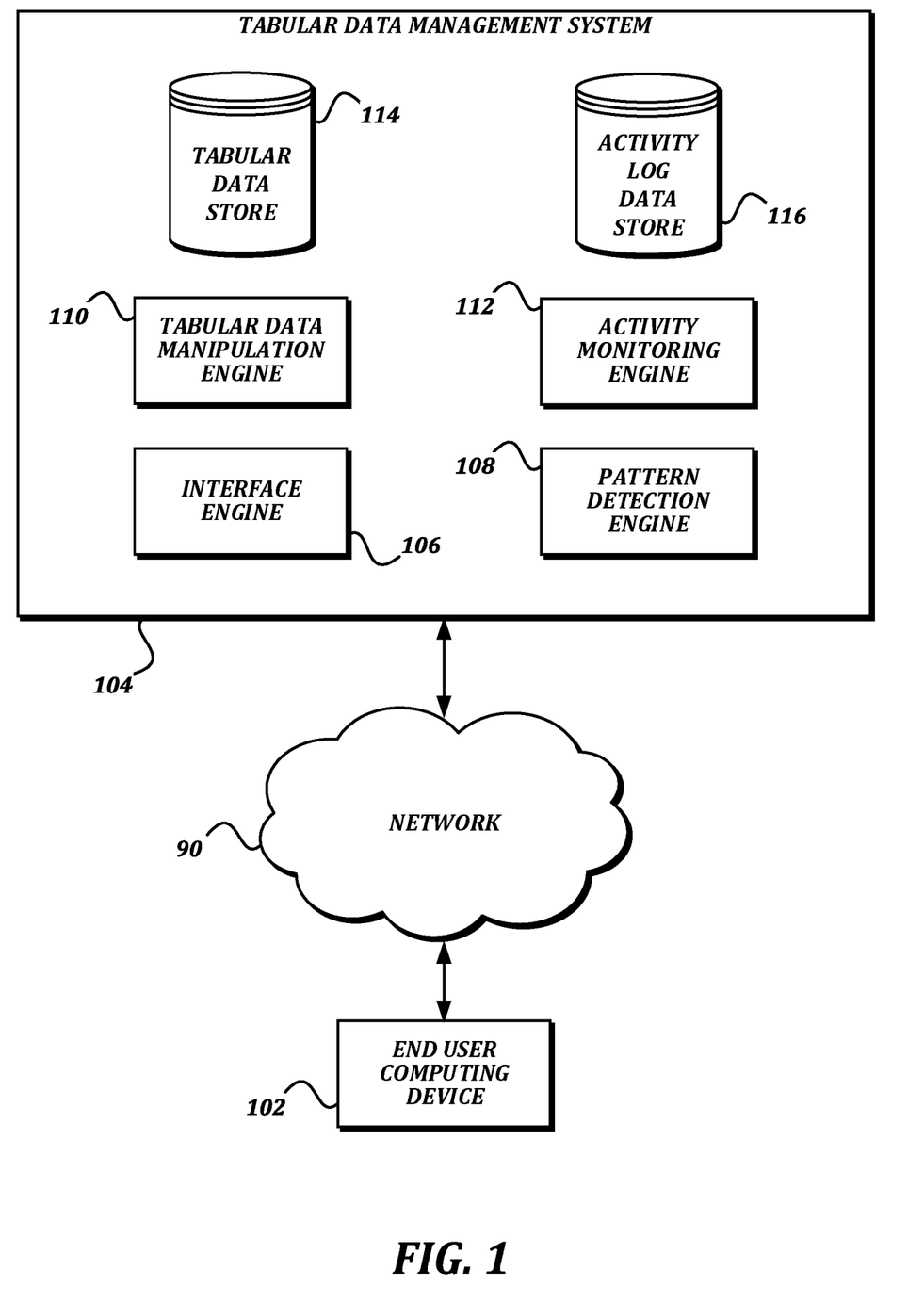
FIG. 1 is a block diagram that illustrates an example embodiment of a tabular data management system according to various aspects of the present disclosure.

FIG. 1 is a block diagram that illustrates an example embodiment of a tabular data management system according to various aspects of the present disclosure. In general, the tabular data management system 104 provides storage for and interaction with tabular data. The tabular data management system 104 is commonly provided via one or more server computing devices, such as those included in a cloud computing service, though any other type of computing device or combination of computing devices may be used to provide the tabular data management system 104. The tabular data management system 104 is accessed by one or more end user computing devices 102 via a network 90. the end user computing devices 102 may be any type of computing device capable of interacting with the tabular data management system 104 via the network 90, including but not limited to desktop computing devices, laptop computing devices, server computing devices, and mobile computing devices including but not limited to smartphones and tablet computing devices. The network 90 may include any type of wired or wireless communication technology or combinations thereof, including but not limited to Ethernet, Wi-Fi, WiMAX, Bluetooth, USB, 3G, 4G, LTE, and the Internet.

As illustrated, the tabular data management system 104 includes an interface engine 106, a pattern detection engine 108, a tabular data manipulation engine 110, an activity monitoring engine 112, a tabular data store 114, and an activity log data store 116.

In general, the word "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or application.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, the interface engine 106 is configured to provide one or more interfaces through which users of the end user computing devices 102 can access tabular data stored by the tabular data management system 104. One example of an interface that may be provided by the interface engine 106 is a web-based interface accessible via a web browser that allows a user to access and manipulate the tabular data. Another example of an interface that may be provided by the interface engine 106 is an application programming interface (API) that allows programmatic access to the tabular data. The API may be coupled with a user interface provided by an application executing on the end user computing device 102. In some embodiments, a combination of functionality executing on the server and functionality executing on the end user computing device 102 may be used to provide the interface. In some embodiments, the interface engine 106 may also provide interfaces for system management tools, including but not limited to interfaces for guiding the creation of or for verifying the automatic creation of automatic actions. In some embodiments, the interface engine 106 may be configured to create automatic actions, as discussed further below.

In some embodiments, the tabular data manipulation engine 110 provides functionality to other portions of the tabular data management system 104 to access the tabular data in the tabular data store 114. For example, the tabular data manipulation engine 110 may receive and process commands from the interface engine 106 to add, move, edit, or delete data. As another example, the tabular data manipulation engine 110 may execute macros, detect events, or execute rules to apply conditional formatting.

In some embodiments, the tabular data store 114 stores the data that is presented in tabular format by the interface engine 106. In some embodiments, the tabular data store 114 may also store user account information and manage permission information and user access to specific tabular data. In some embodiments, the tabular data store 114 may also store data in non-tabular formats, including but not limited to files that are attached in a native format to tabular data.

Some aspects of the interface engine 106, the tabular data manipulation engine 110, and the tabular data store 114 are common among tabular data management systems. The tabular data management system 104 described herein is enhanced by virtue of inclusion of the activity monitoring engine 112, the activity log data store 116, and the pattern detection engine 108. In some embodiments, the activity monitoring engine 112 receives notifications from the interface engine 106 when a user interacts with tabular data through an interface, and stores an activity record representing each interaction in the activity log data store 116. In some embodiments, the pattern detection engine 108 then processes the activity records in the activity log data store 116 to detect patterns of interactions that indicate an opportunity to create automation for the detected activities. Further details of the operation of the components of the tabular data management system 104 are described below.

Figure 2:
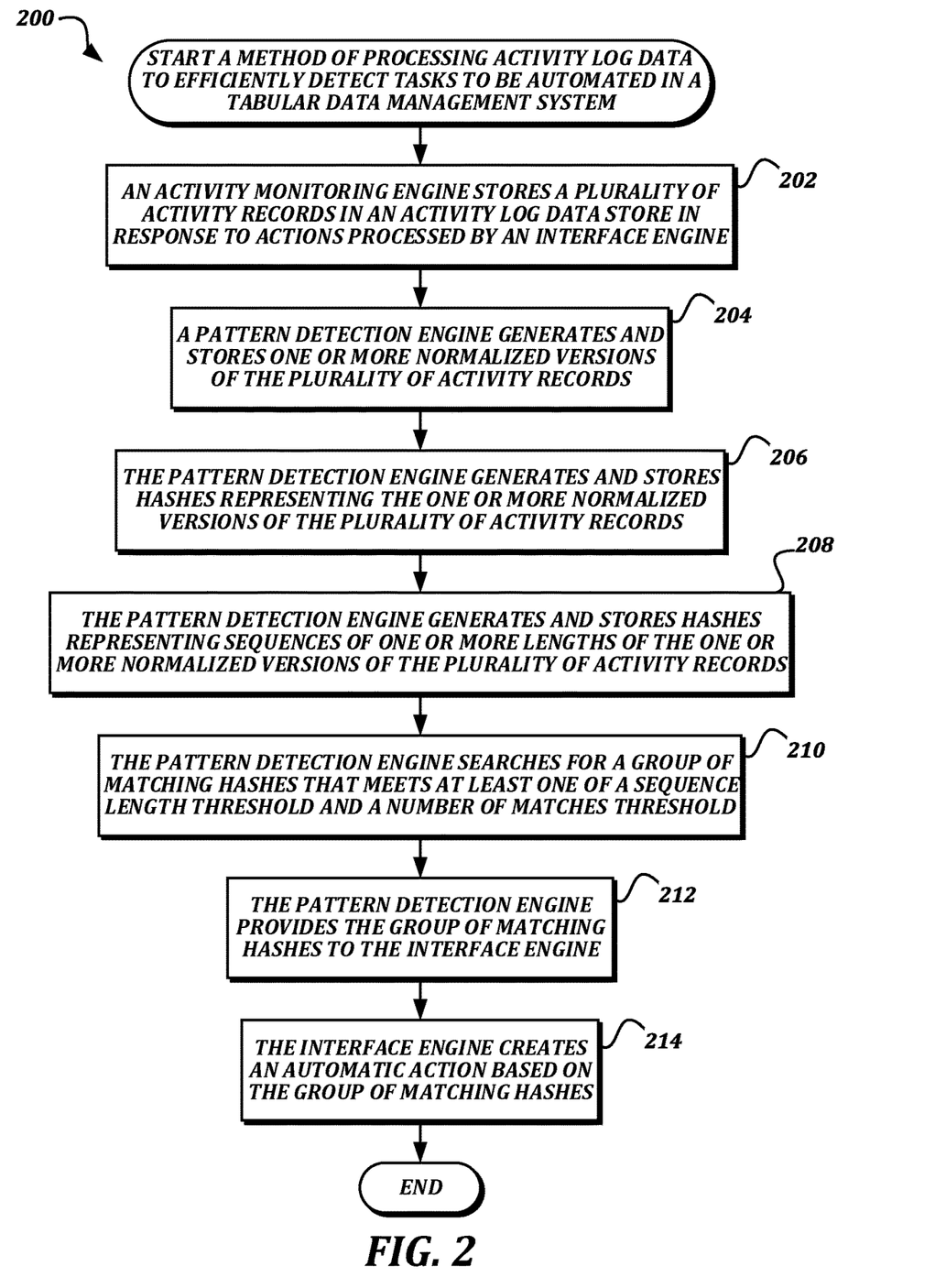
FIG. 2 is a flowchart that illustrates an example embodiment of a method of processing activity log data to efficiently detect tasks to be automated in a tabular data management system according to various aspects of the present disclosure.

FIG. 2 is a flowchart that illustrates an example embodiment of a method of processing activity log data to efficiently detect tasks to be automated in a tabular data management system according to various aspects of the present disclosure. From a start block, the method 200 proceeds to block 202, where an activity monitoring engine 112 stores a plurality of activity records in an activity log data store 116 in response to actions processed by an interface engine 106. In some embodiments, the interface engine 106 may provide notifications to the activity monitoring engine 112 each time tabular data is manipulated via the interface. In some embodiments, the notifications may be provided to the activity monitoring engine 112 by the tabular data manipulation engine 110 upon receiving instructions to manipulate data from the interface engine 106. In some embodiments, a level of logging performed by the activity monitoring engine 112 may be configurable by a user, such that the activity monitoring engine 112 may configurably ignore some of the notifications received without creating activity records for them. The level of logging may be adjustable on a per-user basis, may be adjustable to apply to certain types of activities and not to others, or may be adjustable in any other suitable way.

Figure 3A:
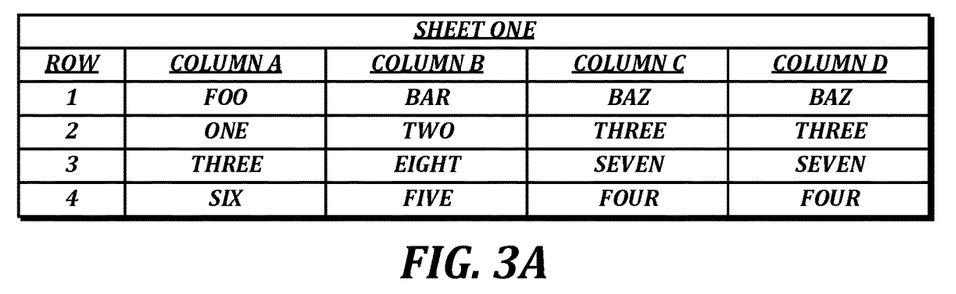
FIGS. 3A-3C are example illustrations of tabular data and activity records representing manipulation thereof according to various aspects of the present disclosure.
Figure 3B:
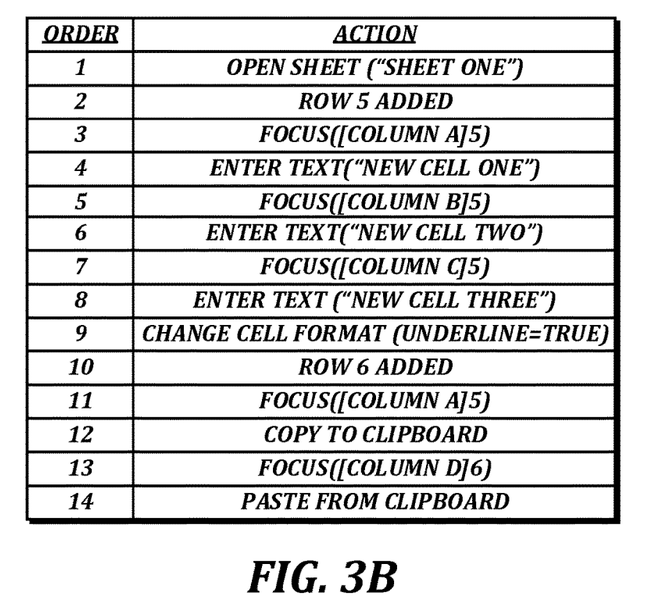
Figure 3C:
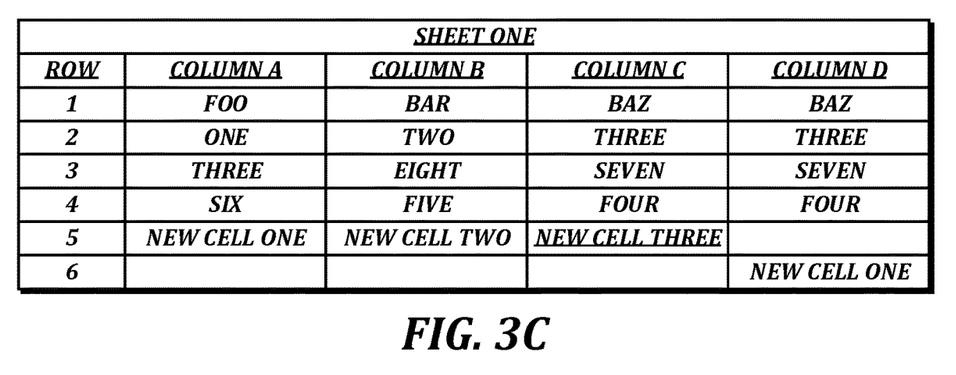

To show examples of manipulation of tabular data, as well as examples of activity records created in response to the manipulation of the tabular data, FIGS. 3A-3C are example illustrations of tabular data and activity records representing manipulation thereof according to various aspects of the present disclosure. FIG. 3A illustrates an example table named "Sheet One" with four rows numbered "1" through "4," and four columns labeled "Column A," "Column B," "Column C," and "Column D." Each column and row intersect in a cell, which stores a value. In some embodiments, cells may be referred to by a combination of its column and its row. For example, in FIG. 3A, the cell that contains the value "two" may be referred to as the cell at Column B, row 2, or in a more compact manner as "[Column B]2."

FIG. 3B illustrates an example set of activity records that show changes being made to the table illustrated in FIG. 3A. The activity records proceed in chronological order, and show a set of actions that are largely self-explanatory. The sheet is opened (record #1), and then a new row (row 5) is added (record #2). Focus is applied to "Column A" of the new row (record #3), and the text "new cell one" is entered into the cell (record #4). Focus then moves to "Column B" of the new row (record #5), and the text "new cell two" is entered into the cell (record #6). Focus moves to "Column C" of the new row (record #7), the text "new cell three" is entered into the cell (record #8), and the format is changed to underline (record #9). Another new row (row 6) is added (record #10), and the value from "Column A" of row 5 is copied and pasted into "Column D" of row 6 (records #11-14). For clarity, FIG. 3C illustrates an example of the table from FIG. 3A after the actions described in the activity records of FIG. 3B have been performed.

Figure 4:
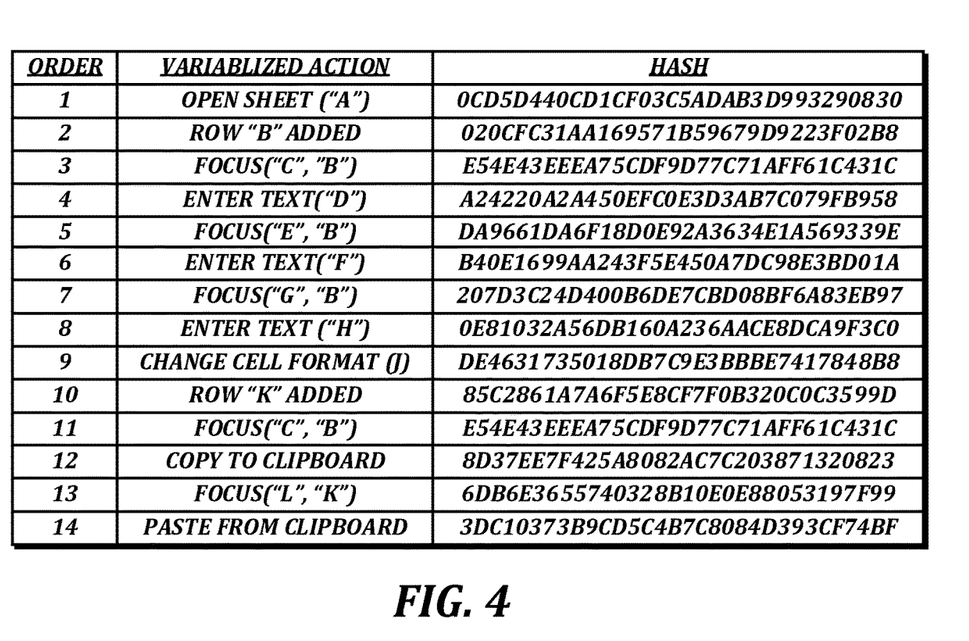
FIG. 4 shows the result of a first normalization technique being applied to the activity records previously illustrated in FIG. 3B, according to various aspects of the present disclosure.

Returning to FIG. 2, at block 204, a pattern detection engine 108 generates and stores one or more normalized versions of the plurality of activity records. While it may be possible to find repeated activity records that match each other exactly, performance of the system can be improved by normalizing the activity records such that activity records of the same type will match each other, even if they are not exactly the same. FIG. 4 shows the result of a first normalization technique being applied to the activity records previously illustrated in FIG. 3B, according to various aspects of the present disclosure. In the activity records of FIG. 4, the particular variables (such as column names, row numbers, inserted text, and the like) have been replaced with placeholder values. As shown, the value "5" used to show the insertion of row "5" has been replaced with a variable, "B." Likewise, the column name "Column A" has been replaced with a variable, "C." The variable names themselves are listed for the sake of discussion only, but could be any value that indicates, for example, that the same row is being addressed in activity record #3 and activity record #5, or that the same column is being addressed in activity record #3 and activity record #11. The activity records of FIG. 4 also include a hash value. The computation and use of the hash values will be described in further detail below.

Figure 5:
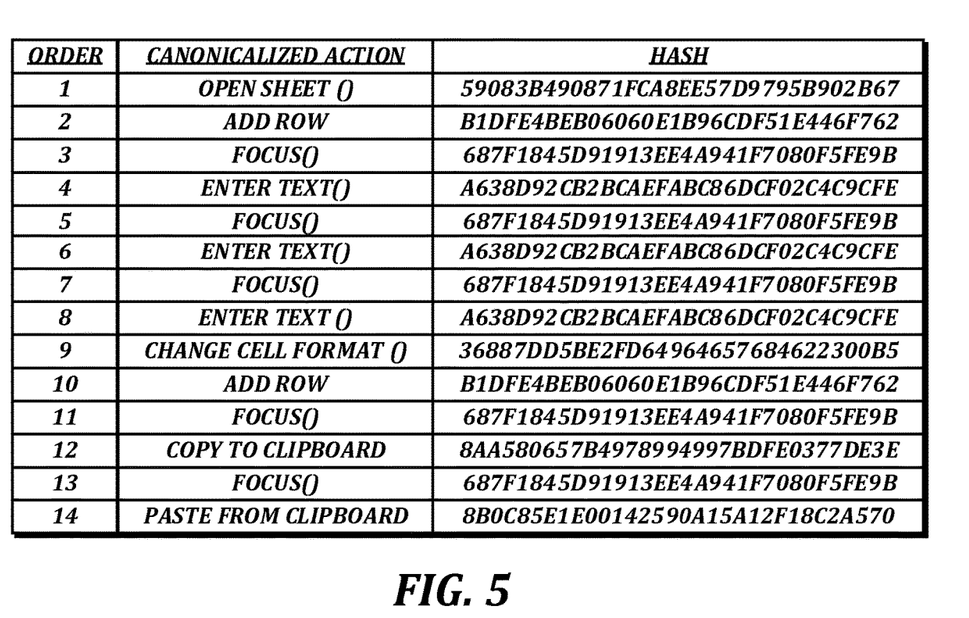
FIG. 5 shows the result of a second normalization technique being applied to the activity records previously illustrated in FIG. 3B, according to various aspects of the present disclosure.

FIG. 5 shows the result of a second normalization technique being applied to the activity records previously illustrated in FIG. 3B, according to various aspects of the present disclosure. In the activity records of FIG. 5, the variables (such as column names, row numbers, inserted text, and the like) have been removed entirely. Instead, all that remains is the type of action that was performed. The activity records of FIG. 5 also include a hash value, which will be described in further detail below.

In some embodiments, further normalization techniques may be used to improve the detection of repeated patterns of actions. For example, normalization may cause multiple activity records that record edits being applied to a single cell to be collapsed into a single activity record that represents all of the edits that were applied to the single cell. As another example, a series of activity records representing edit actions applied to different cells may be normalized by reordering the activity records in a canonical order. For instance, if a first set of three activity records represent edits to values in (1) [Column A], then (2) [Column C], then (3) [Column B]; and a second set of three activity records represent edits to values in (1) [Column C], then (2) [Column A], then (3) [Column B]; these two sets of activity records may both be normalized by reordering the activity records in a canonical order, such as (1) [Column A], then (2) [Column B], then (3) [Column C]. In this way, these two groups of similar edits may be found to match each other. The canonical ordering of edits may be any suitable ordering, including but not limited to alphabetical order based on column name, order of column creation, and display order. As still another example, a group of activity records representing edits to a single row may be collapsed into a single activity record that indicates how many edits were made to the row. For instance, a first edit, a second edit, and a third edit to a given row may be collapsed into a single activity record that indicates "3 edits on the given row."

In some embodiments, the pattern detection engine 108 may augment the activity records by storing one or more normalized forms of the activity record in association with the activity record. For example, the pattern detection engine 108 may add one or more of the variablized form (as illustrated in FIG. 4) or the canonicalized form (as illustrated in FIG. 5) to the activity record in the activity log data store 116.

Returning to FIG. 2, at block 206, the pattern detection engine 108 generates and stores hashes representing the one or more normalized versions of the plurality of activity records, and at block 208, the pattern detection engine 108 generates and stores hashes representing sequences of one or more lengths of the one or more normalized versions of the plurality of activity records. In some embodiments, hashes may be generated and stored for the raw activity records as well. Hashing techniques are well known to those of ordinary skill in the art, and so are not described in detail herein. In some embodiments, suitable hashing techniques include, but are not limited to, MD5 (or later versions) and SHA-256 (or later versions). In some embodiments, the hashing technique generates a cryptographic hash that is less likely to generate unintended collisions. In some embodiments, the hashing technique may result in unintended collisions between hash values that do not represent matching activity records, and the remaining parts of the method 200 may compensate for such unintended collisions.

In the simplest case, the activity records may be individually hashed. For example, the activity records illustrated FIG. 4 each include an MD5 hash value that is a hashed version of the text representation of the variablized action, and the activity records illustrated in FIG. 5 each include an MD5 hash value that is a hashed version of the text representation of the canonicalized action. As is readily apparent from the FIGURES, different normalization techniques can cause different hash value matching. For example, in FIG. 4, the hash of row 2 does not match the hash of row 10, though in FIG. 5, these hashes do match. The example use of a text representation of the variablized/canonicalized action as the value to be hashed is done for the sake of explanation and should not be seen as limiting. In some embodiments, any other suitable representation of the variablized/canonicalized action, including but not limited to a serialized representation, an XML representation, a binary representation, or a JSON representation may be used.

Figure 6:
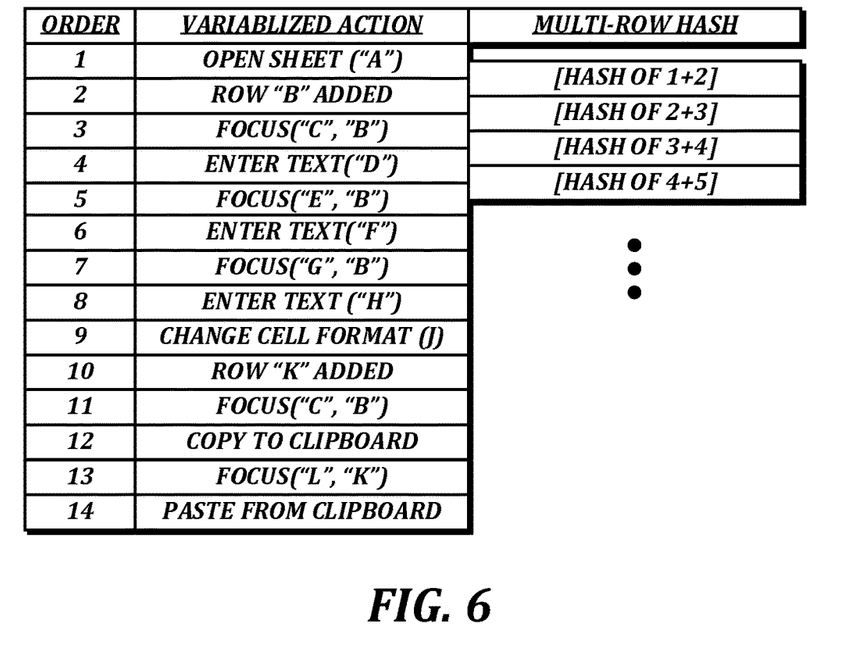
FIG. 6 illustrates a first example of multi-row hashing according to various aspects of the present disclosure.
Figure 7:
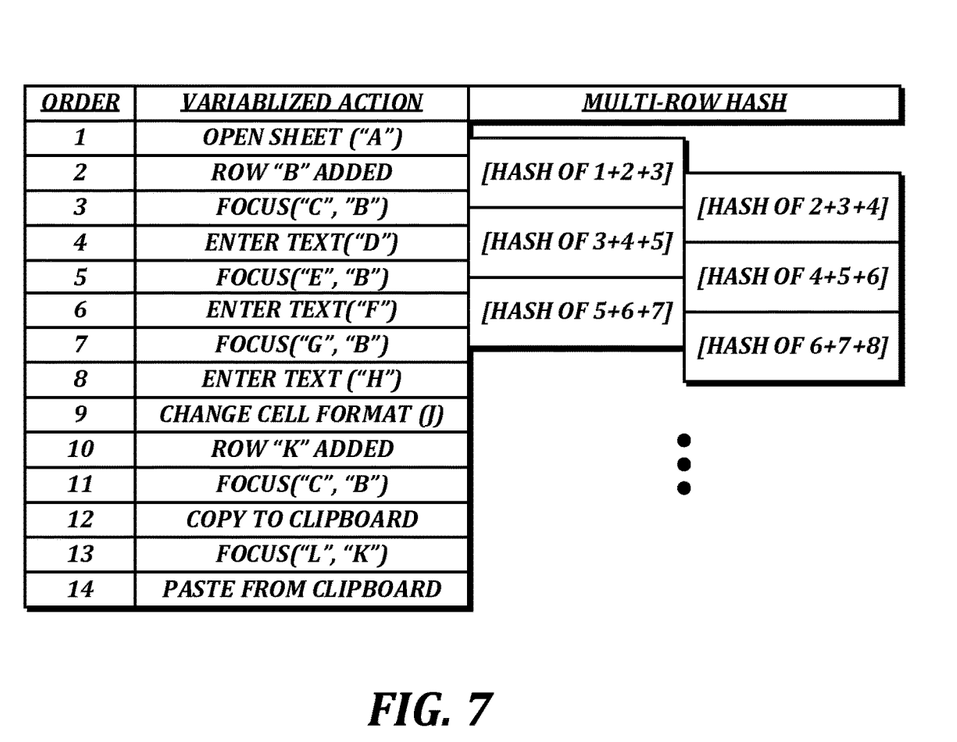
FIG. 7 illustrates a second example of multi-row hashing according to various aspects of the present disclosure.

FIG. 6 illustrates a first example of multi-row hashing according to various aspects of the present disclosure. In FIG. 6, instead of hashing the contents of each activity record separately, the pattern detection engine 108 hashes the contents of two consecutive records together. Accordingly, the first hash value represents the contents of row 1 combined with the contents of row 2, the second hash value represents the contents of row 2 combined with the contents of row 3, and so on. FIG. 7 illustrates a second example of multi-row hashing according to various aspects of the present disclosure. In FIG. 7, the pattern detection engine 108 hashes the contents of three consecutive records together. Accordingly, the first hash value represents the contents of row 1 combined with the contents of row 2 and row 3, the second hash value represents the contents of row 2 combined with the contents of row 3 and row 4, and so on. Though FIGS. 6 and 7 only illustrate the combination of two consecutive records and three consecutive records, respectively, in some embodiments, four or more consecutive records may be hashed together.

Figure 8:
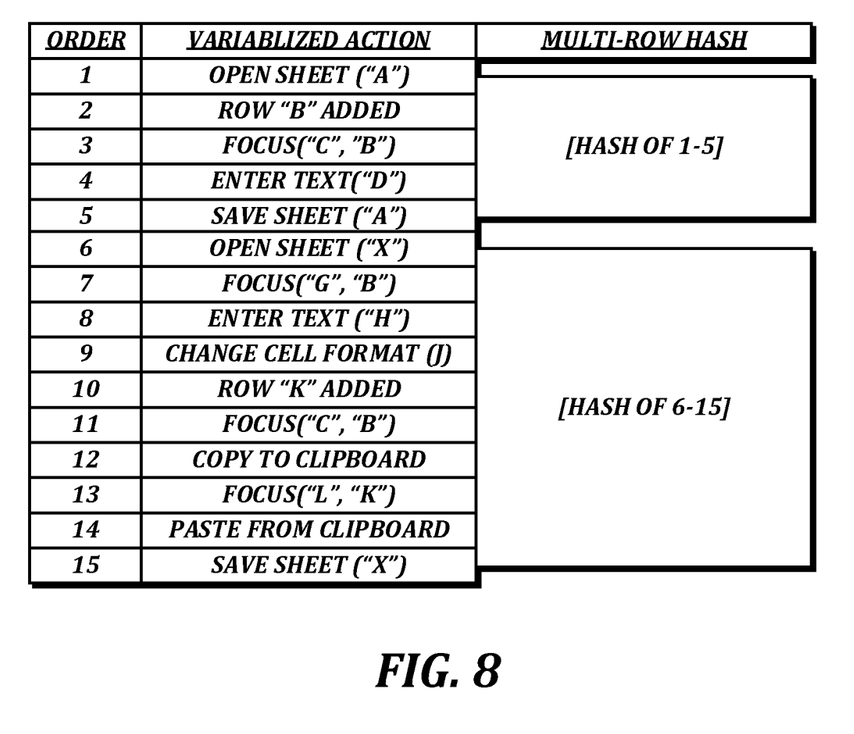
FIG. 8 illustrates a third example of multi-row hashing according to various aspects of the present disclosure.

FIG. 8 illustrates a third example of multi-row hashing according to various aspects of the present disclosure. In FIG. 8, instead of hashing together predetermined numbers of consecutive rows, groups of rows are hashed together starting with a detected start activity record and ending with a detected end activity record. Typically, a start activity record may be a type of activity record that indicates a start of a group of actions, and an end activity record may be a type of activity record that indicates an end of a group of actions. Some examples of start activity records include, but are not limited to, activity records that represent an "open sheet" action, a "focus" action, a "copy" action, a "paste" action, and a "search" action. Some example of end activity records include, but are not limited to, activity records that represent a "save sheet" action, a "close sheet" action, and a "focus" action. As shown in FIG. 8, the "open sheet" actions in row 1 and row 6 are identified as start activity records, and the "save sheet" actions in row 5 and row 15 are identified as end activity records. Accordingly, the group of rows from row 1 to row 5 are hashed together to create a single hash value, and the group of rows from row 6 to row 15 are hashed together to create a single hash value. In some embodiments, activity records that occur between an identified end activity record and the next identified start activity record may be disregarded for pattern detection purposes.

In some embodiments, additional techniques may be used to detect start activity records and end activity records. For example, a navigation into a row (e.g., a "focus" action on a first row) may be identified as a start activity record, and a navigation away from the row (e.g., a "focus" action on a second row different from the first row) may be identified as an end activity record. Further, in such an embodiment, a navigation back to the first row without performing any actions that make changes to the data may cause the record previously identified as an end activity record to no longer be identified as an end activity record. This may occur if, for example, a first cell in a first row obtains focus, various edits are made to the first cell, a second cell in a second row obtains focus, information is copied out of the second cell without changing the second cell, and the information is pasted into a cell in the first row.

In some embodiments, sliding windows may be used to detect a group of activity records that indicate a start event, and/or a group of activity records that indicate an end event. While such a brute force method may consume more processing time, it may result in being able to detect otherwise undetectable patterns. In such embodiments, a sliding window of activity records (e.g., two consecutive activity records, three consecutive activity records, etc.) may be hashed together, similar to the illustrations in FIGS. 6 and 7. If a matching hash value is found, the matching groups of activity records may be designated as start activity records to detect patterns in the activity records that follow.

Though illustrated in a way to show which rows are combined, in some embodiments, the hash values may be stored in any suitable way that identifies at least one of the rows included in the hash, such as in the first activity record that is hashed, or in another data structure that references the rows that have been combined. The contents themselves may be combined in any suitable manner, including but not limited to concatenating representations of the rows before performing the hash function, and generating hash values for each individual row and then computing a combined hash of the hash values instead of the row contents.

In some embodiments, hash values for combined activity records may be created in a chained manner instead of combining the activity records before hashing. For example, a hash value may be created by executing the hash function on the activity record of row 1, a combined hash value for row 1 and row 2 may subsequently be created by executing the hash function on a combination of the hash value for row 1 and the activity record of row 2, a combined hash value for rows 1-3 may then be created by executing the hash function on a combination of the combined hash value for row 1 and row 2 with the activity record of row 3, and so on. The hash chain may be started and stopped at any point in a sequence of activity log records as appropriate.

At block 210 (FIG. 2), the pattern detection engine 108 searches for a group of matching hashes that meets at least one of a sequence length threshold and a number of matches threshold. In some embodiments, the sequence length threshold and the number of matches threshold may be tuned in order to surface meaningful patterns in the activity records and to ignore patterns that arise by chance. For example, short sequences may typically have many matches due to random chance alone (e.g., an "open sheet" action would often be followed by a "focus" action), and so a higher number of matches may be desired before determining a meaningful pattern exists in short matching sequences. Conversely, long sequences of actions that match each other are less likely to occur through random chance, and so a lower number of matches would be needed to indicate a meaningful pattern. In some embodiments, different thresholds may be established for comparing raw activity records, variablized activity records, or canonicalized activity records. For example, a short sequence of raw activity records that match each other (e.g., a particular cell gains focus, and then a specific value is entered into the cell) may be appropriate for a lower number of matches threshold, while a short sequence of canonicalized activity records (e.g., any cell gains focus, and then any value is entered into the cell) may be appropriate for a higher number of matches threshold.

The use of combined hashes (instead of direct comparison of activity records) provides technical benefits, at least in that it provides a dramatic decrease in the processing time required to search for matching groups of activity records. For example, once a hash is created for a new group of activity records, all of the existing hashes of activity record groups of all sizes may be searched in O(n) time (where n is the number of existing hashes stored). In contrast, without the use of hashes applied to groups of activity records, the same search would require O(n*m) time, where n is the number of existing activity records stored, and m is the sequence length being compared. The excess processing power thus made available for other purposes, such as increasing the responsiveness of the system, or increasing the numbers and lengths of sequences to be compared. Being able to efficiently compare multiple different sequence lengths, and to efficiently compare longer sequences, allows the system to find patterns that were not possible to detect before in a system that provides a high level of interactivity.

The method 200 then proceeds to block 212, where the pattern detection engine 108 provides the group of matching hashes to the interface engine 106. In some embodiments, the interface engine 106 may use the matching hashes to find the groups of activity records associated with the matching hashes. In some embodiments, the interface engine 106 is provided with the groups of activity records. In some embodiments, the interface engine 106 may receive not only normalized versions of the activity records, but may also receive the raw versions of the activity records.

Next, at block 214, the interface engine 106 creates an automatic action based on the group of matching hashes. In some embodiments, the interface engine 106 may obtain the activity records that are associated with the matching hashes, and may use the activity records to determine the actions to be automated. For example, if a hash of activity records #1-3 was found to match a hash of activity records #23-25, the corresponding activity records would be retrieved, possibly along with their variablized form and their canonicalized form. In some embodiments, the most detailed matching form of the activity records may be used. In other words, if the raw activity records themselves match each other, then the raw activity records may be used to create the automatic action. If the raw activity records do not match each other but the variablized form of the activity records match each other (and, inherently, the canonicalized form of the activity records also match each other), then the variablized form of the activity records will be used to create the automatic action. If only the canonicalized form of the activity records match each other, then the canonicalized form of the activity records will be used to create the automatic action.

In some embodiments, when many matching hashes are found, different levels of generality may match within the group of matching hashes. For example, if ten activity records are associated with matching hashes at the variablized level, with five of the activity records also matching at the raw activity record level and five of the activity records not matching at the raw activity record level, then the contents of the five activity records that match at the raw activity record level may be given more weight in determining the automatic action to create.

In some embodiments, different types of automatic actions may be created. For example, in some embodiments, a macro may be created that, when executed, automatically performs all of the actions identified as matching. As another example, in some embodiments, a form or other type of interface may be created based on the action records identified as matching. The level of generality of the matching form of the activity records used to create the automatic action may impact the type of automatic action that can be created. Using the set of activity records in FIG. 3B as an example, if activity records #1-4 are matched at the raw activity record level, then a macro may be created that (1) opens the sheet named "sheet one", (2) inserts a new row that is "row 5," (3) applies focus to the cell at "Column A" of "row 5," and (4) enters the text "NEW CELL ONE" to the cell, all without further user interaction. If activity records #1-4 are matched at the variablized level and not the raw activity record level, then a form may be created to prompt the user to provide variable information. For example, the automatic action may (1) open a sheet indicated by the user; (2) add a new row to a default location; (3) present a form that includes a drop-down that allows the user to select a column name, and includes a text entry box for the user to input a text value; and (4) add the entered text to the selected column upon confirmation by the user. In some such embodiments, the automatic action may use the non-matching information from the raw activity records to generate auto-fill values for the automatically generated form.

In some embodiments, the user may be provided an opportunity to choose a type of automatic action that is created. For example, the user may choose that the automatic action is created as a form, or as a macro. As another example, the user may choose how the automatic action is launched, including but not limited to via a button press, via a keystroke combination, in response to an event such as the opening of a sheet or the adding/editing of a cell, or in response to detection of a predetermined sequence of actions. In some embodiments, once the interface engine 106 has determined appropriate steps to be included in the automatic action, the interface engine 106 may provide the user the opportunity to edit the steps of the automatic action.

The method 200 then proceeds to an end block and terminates.

Numerous improvements to tabular data management technology are provided by the present disclosure. For example, before the introduction of the combined record hashing described above, it was impractical to search activity records for matching sequences of activities, particularly for applications having large numbers of concurrent users. The benefits provided by the combined record hashing not only provide improvements by reducing the amount of computing power necessary to perform the sequence comparisons, but this reduction in required computing power in turn allows sequences of activity records to be searched at internet scale for large numbers of concurrent users interacting in real time. Centralized computing devices were not capable of performing these comparisons at such a large scale before the techniques of the present disclosure. Even hashing a single activity log record provides benefits when comparing it to other activity log records. For example, if activity log records are hashed to create hash values that fit in a processor register, then the hash values can be compared to each other with a single efficient processor operation regardless of the size of the raw activity log records.

Further, the particular technical environment used in the present disclosure provides additional benefits. Because the combined hashing technology allows a central server to concurrently detect sequences from large numbers of end users, the sequence monitoring functionality does not have to be executed on the end user computing devices. This saves processing power on the end user computing devices, which can be particularly important when the end user computing devices are battery powered and must therefore minimize power consumption to increase battery life. The use of the central server, as enabled by the combined hashing technology, allows for the sequence detection functionality to be provided for such battery powered devices. Further, the automatic detection of sequences and creation of automatic actions at a central server helps provide users of mobile end user computing devices, such as smartphones, take advantage of the creation of automation. Otherwise, users of smartphones would not likely create automation, because the interfaces provided for doing so would be difficult and tedious to use on the small amount of screen real estate that smartphones provide.

Figure 9:
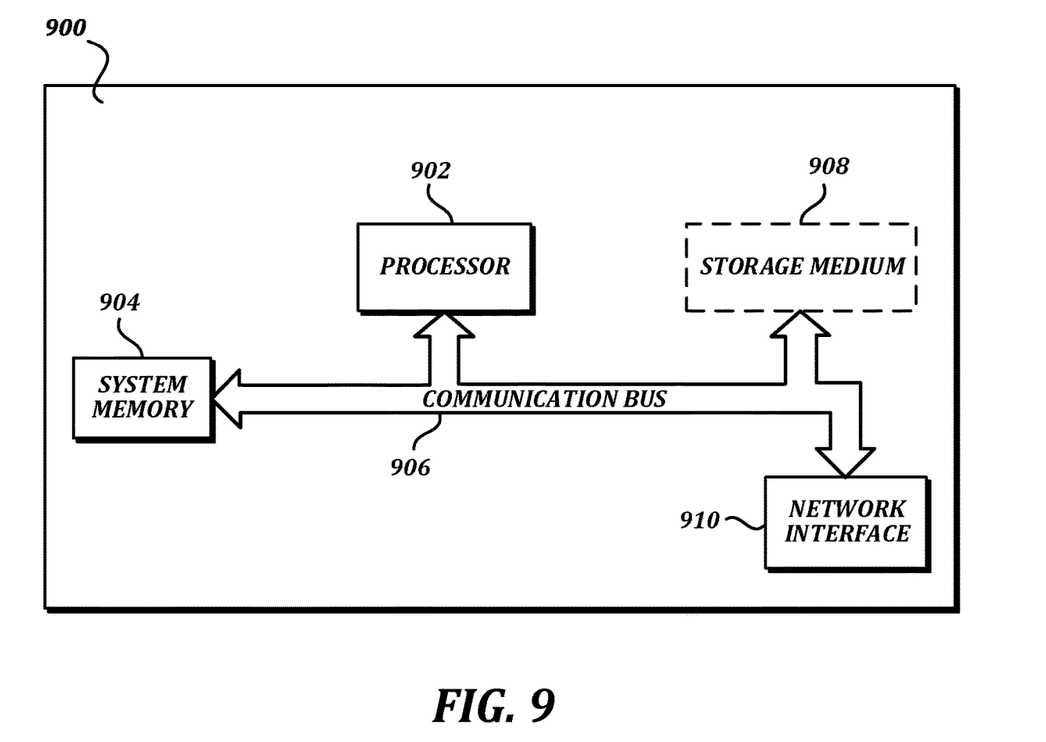
FIG. 9 is a block diagram that illustrates aspects of an exemplary computing device appropriate for use with embodiments of the present disclosure.

FIG. 9 is a block diagram that illustrates aspects of an exemplary computing device 900 appropriate for use with embodiments of the present disclosure. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 900 may be any one of any number of currently available or yet to be developed devices.

In its most basic configuration, the computing device 900 includes at least one processor 902 and a system memory 904 connected by a communication bus 906. Depending on the exact configuration and type of device, the system memory 904 may be volatile or nonvolatile memory, such as read only memory ("ROM"), random access memory ("RAM"), EEPROM, flash memory, or similar memory technology. Those of ordinary skill in the art and others will recognize that system memory 904 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as WiFi, 2G, 3G, LTE, WiMAX, Bluetooth, and/or the like.

In the exemplary embodiment depicted in FIG. 9, the computing device 900 also includes a storage medium 908. However, services may be accessed using a computing device that does not include means for persisting data to a local storage medium. Therefore, the storage medium 908 depicted in FIG. 9 is represented with a dashed line to indicate that the storage medium 908 is optional. In any event, the storage medium 908 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 904 and storage medium 908 depicted in FIG. 9 are merely examples of computer-readable media. Computer-readable media can be used to store data for use by programs. Accordingly, the terms "electronic spreadsheet," "grid," "table," "cell," "spreadsheet data," "sheet data," "column entry," "row entry," and others used herein describe display formats and logical inter-relationships for information stored on a computer-readable medium of a computing device 900.

Suitable implementations of computing devices that include a processor 902, system memory 904, communication bus 906, storage medium 908, and network interface 910 are known and commercially available. For ease of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, USB, or other suitable connections protocols using wireless or physical connections. Similarly, the computing device 900 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer-readable storage medium associated with a computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of automatically generating automation for manipulating tabular data, the method comprising:
   obtaining, by a computing device, a set of activity log records;
   combining, by the computing device, activity log records of the set of activity log records to create at least two distinct sequential groups of activity log records by, for each sequential group of activity log records:
   determining a first activity log record;

determining a second activity log record that follows the first activity log record; and concatenating the first activity log record, the second activity log record, and any activity log records between the first activity log record and the second activity log record in chronological order to create the sequential group of activity log records;

hashing, by the computing device, the at least two distinct sequential groups of activity log records to create a set of at least two hash values that represent content and order of the activity log records in each sequential group of activity log records;

detecting a pattern by finding, by the computing device, two or more duplicate hash values within the set of at least two hash values; and automating the detected pattern by creating, by the computing device, an automated action sequence using the activity log records used to create the two or more duplicate hash values;

wherein creating the automated action sequence includes at least one of:

creating a macro that causes actions to be performed that are represented by the activity log records used to create the two or more duplicate hash values; and creating a form that collects data for variables within the activity log records used to create the two or more duplicate hash values.

2. The method of claim 1, further comprising normalizing, by a computing device, the activity log records before the combining, wherein normalizing includes removing references to specific data from the activity log records.

3. The method of claim 1, further comprising normalizing, by a computing device, the activity log records before the combining, wherein normalizing includes altering references to specific data to be references to generic data.

4. The method of claim 1, wherein combining the activity log records of the set of activity log records to create the at least two distinct sequential groups of activity log records includes:

combining a first hash value that represents a first sequential group of activity log records with a second activity log record to create a chained activity log record.

5. The method of claim 1, wherein the second activity log record immediately follows the first activity log record.

6. The method of claim 1, wherein determining the first activity log record includes detecting a start activity log record; and wherein determining the second activity log record includes detecting a stop activity log record that follows the start activity log record.

7. The method of claim 1, wherein:

for a first sequential group of activity log records, determining the second activity log record that follows the first activity log record includes identifying an activity log record that is a first predetermined number of activity log records after the first activity log record;

for a second sequential group of activity log records, determining the second activity log record that follows the first activity log record includes identifying an activity log record that is a second predetermined number of activity log records after the first activity log record;

wherein hashing the at least two distinct sequential groups of activity log records to create the set of at least two hash values includes:

hashing the first sequential group of activity log records to create a first hash value; and hashing the second sequential group of activity log records to create a second hash value;

wherein the first predetermined number of activity log records is smaller than the second predetermined number of activity log records.

8. The method of claim 7, wherein detecting a pattern by finding two or more duplicate hash values includes:

detecting a first pattern by finding that a number of hash values that match the first hash value is greater than a first threshold; and detecting a second pattern by finding that a number of hash values that match the second hash value is greater than a second threshold;

wherein the first threshold is higher than the second threshold.

9. The method of claim 1, further comprising:

normalizing, by a computing device, the sequential groups of activity log records prior to hashing, wherein the normalizing includes combining multiple consecutive activity log records that each represent edits to a given row or cell into a single activity log record that represents all of the edits to the given row or cell.

10. A tabular data management system comprising one or more computing devices configured to automatically generate automation by:

obtaining a set of activity log records;

combining activity log records of the set of activity log records to create at least two distinct sequential groups of activity log records by, for each sequential group of activity log records:

determining a first activity log record;

determining a second activity log record that follows the first activity log record; and concatenating the first activity log record, the second activity log record, and any activity log records between the first activity log record and the second activity log record in chronological order to create the sequential group of activity log records;

hashing the at least two distinct sequential groups of activity log records to create a set of at least two hash values that represent content and order of the activity log records in each sequential group of activity log records;

detecting a pattern by finding two or more duplicate hash values within the set of at least two hash values; and automating the detected pattern by creating an automated action sequence using the activity log records used to create the two or more duplicate hash values;

wherein creating the automated action sequence includes at least one of:

creating a macro that causes actions to be performed that are represented by the activity log records used to create the two or more duplicate hash values; and creating a form that collects data for variables within the activity log records used to create the two or more duplicate hash values.

11. The system of claim 10, wherein the one or more computing devices are further configured to normalize the activity log records before the combining, wherein normalizing includes removing references to specific data from the activity log records.

12. The system of claim 10, wherein the one or more computing devices are further configured to normalize the activity log records before the combining, wherein normalizing includes altering references to specific data to be references to generic data.

13. The system of claim 10, wherein combining the activity log records of the set of activity log records to create the at least two distinct sequential groups of activity log records includes:
   combining a first hash value that represents a first sequential group of activity log records with a second activity log record to create a chained activity log record.

14. The system of claim 10, wherein the second activity log record immediately follows the first activity log record.

15. The system of claim 10,
   wherein determining the first activity log record includes detecting a start activity log record;
   wherein determining the second activity log record includes detecting a stop activity log record that follows the start activity log record.

16. The system of claim 10, wherein:
   for a first sequential group of activity log records, determining the second activity log record that follows the first activity log record includes identifying an activity log record that is a first predetermined number of activity log records after the first activity log record;
   for a second sequential group of activity log records, determining the second activity log record that follows the first activity log record includes identifying an activity log record that is a second predetermined number of activity log records after the first activity log record;
   wherein hashing the at least two distinct sequential groups of activity log records to create the set of at least two hash values includes:
      hashing the first sequential group of activity log records to create a first hash value; and
      hashing the second sequential group of activity log records to create a second hash value;
   wherein the first predetermined number of activity log records is smaller than the second predetermined number of activity log records.

17. The system of claim 16, wherein detecting a pattern by finding two or more duplicate hash values includes:
   detecting a first pattern by finding that a number of hash values that match the first hash value is greater than a first threshold; and
   detecting a second pattern by finding that a number of hash values that match the second hash value is greater than a second threshold;
   wherein the first threshold is higher than the second threshold.

18. The system of claim 10, wherein the one or more computing devices are further configured to:
   normalize the sequential groups of activity log records prior to hashing, wherein the normalizing includes
      combining multiple consecutive activity log records that each represent edits to a given row or cell into a single activity log record that represents all of the edits to the given row or cell.

* * * * *